United States Patent Office 3,023,172
Patented Feb. 27, 1962

3,023,172
PREPARATION OF A MICROSPHEROIDAL SILICA-ALUMINA FLUID CRACKING CATALYST
William B. Innes and Malden Michael, Stamford, Conn., and Nicholas Chomitz, Yonkers, N.Y., assignors to American Cyanamid Company, New York, N.Y., a corporation of Maine
No Drawing. Filed Apr. 15, 1959, Ser. No. 806,462
16 Claims. (Cl. 252—455)

This invention relates to a process for the preparation of low cost microspheroidal fluid cracking catalysts, and more particularly to the preparation of a low cost, high quality microspheroidal silica-alumina cracking catalyst and to the catalyst so produced. Further, this invention relates to the process of catalytically cracking petroleum hydrocarbons, employing such a catalyst.

We have heretofore attempted to incorporate dry additive materials into cracking catalysts with the principal object in mind of lessening production costs and preventing over-heating during regeneration without seriously detracting from other important properties of the cracking catalyst.

However, the simple mixing of dry materials with hydrogels prior to drying results in a product with excessive fines and poor attrition properties due to uneven shrinkage during drying.

More recent efforts in this direction, as for example, those exemplified in copending application Serial No. 718,471, filed March 6, 1958, in which intimate mixing of dry additive materials in accordance with specific methods whereby intimate association between the additive material and the hydrogel components of the final catalyst products were achieved, has for the most part overcome the difficulties experienced heretofore.

This process, while highly acceptable, insofar as the properties of the final catalyst product are concerned, suffers from rather serious process limitations. Thus, for example, the catalysts, which are normally employed as fluid catalysts and their process for manufacture, require an additional step, namely, that in which the intimate association is achieved. This step usually requires additional apparatus. Thus, such a process, in addition to being somewhat more expensive from the point of view of requiring additional apparatus and to some extent additional time, would be less attractive than one adaptable to current plant facilities and apparatus and one in which conventional processing procedures were employed.

While diluents or additives have been incorporated into catalyst materials for use in pelleted catalysts, the problems encountered in the manufacture of such catalysts are quite different from those encountered in the preparation of spray dried fluid catalyst materials. Thus, for example, in spray dried fluid catalysts, in addition to the catalyst having good activity, regenerability and other important properties, it is essential that the catalyst have good attrition resistance, both as a gel to be spray dried and as a fluid catalyst product to be employed in fluid cracking units.

Accordingly, it is an object of the present invention to provide a commercially acceptable fluid microspheroidal silica-alumina cracking catalyst containing substantial proportions of a low cost inorganic additive material.

It is a further object of the present invention to provide a process for preparing such a microspheroidal silica-alumina cracking catalyst which may be prepared by employing conventional synthetic catalyst plant equipment.

It is a further object to provide such a cracking catalyst having good particle size distribution, substantially uniform particle shape and one in which the additive material is in intimate association with the catalytic material whereby heat dissipation during carbon burning is improved with resulting increase in catalyst life.

It is a further object of this invention to provide such a catalyst in which the catalyst and additive components do not tend to classify.

It is a still further object of this invention to provide such a microspheroidal silica-alumina cracking catalyst at substantially lower manufacturing cost, making it possible to use more catalysts and thereby reduce metal contamination and thus improve selectivity.

Another object of the present invention is to provide a catalyst which is not affected to a greater given level of metal contamination than present synthetic commercial catalysts.

Another and special object of this invention is to provide a microspheroidal silica-alumina fluid catalyst, characterized by low attrition and improved initial activity.

A further special object of this invention is to provide a silica-alumina inorganic additive material, catalyst composition which may be fed efficiently to spray driers at higher solids than conventional synthetic silica-alumina gel catalyst materials.

These and other objects of the present invention will become apparent from the detailed description set forth hereinbelow.

In accordance with the present invention, a process is provided for preparing a microspheroidal silica-alumina fluid cracking catalyst which comprises intimately associating by precipitating in an aqueous media a hydrated silica or silica gel in the presence of a finely divided inorganic silicious additive material. Hydrated alumina is then "precipitated" onto said mixture and the resulting product is spray-dried.

It will be noted that in accordance with the present process, intimate association is readily achieved without employing a homogenizer or other mechanical means described and claimed in our above referred to copending U.S. application.

The hydrated silica or silica gel and hydrated alumina or alumina gel which is precipitated in accordance with this invention are precipitated in such amounts that independent of or excluding the finely divided inorganic silicious additive material, the catalyst would be constituted by from between about 5 and 35% alumina and preferably from between 20 and 30% alumina and the remainder silica. In this connection, one of the features of this invention is that it may be readily adapted to processes for the preparation of high alumina silica-alumina fluid cracking catalysts such as are described in U.S. Patent 2,701,793.

By "precipitated onto" as that expression is employed herein to refer to the coating of silica gel, it is meant that when an aluminum salt is reacted with an alkaline agent, it is believed that a combination or complex is formed between the silica and alumina rather than the formation of an essentially pure aluminum hydroxide.

By "intimate association" as this term is used herein, is meant that in the final product, the additive particles are in direct contact with and enclosed by silica alumina gel as evidenced by microscopic examination. "Intimate association" is accomplished in accordance with the present invention by precipitation of the silica gel and alumina gel in the presence of the additive material.

The "inorganic additive material" employed in this invention may either be a material which is relatively inert with respect to catalytic activity compared to the silica alumina portion of the final catalyst product, or wholly inert with respect to such activity. The additive material is a finely divided inorganic material, preferably having a silicious base, such as silica flour, certain clays, such as natural or uncalcined kaolin clay, calcined and acid treated or leached kaolin and other clays, the residual "muds" left after acid leaching of kaolin and other clays, fullers earth, or the like. Preferably these illustrative additives are alkali metal free. With respect to these additives, it will be noted that the silica flour is substantially inert additive material, while kaolin and fullers earth are possessed of some activity catalytically speaking.

With respect to these and equivalent additives, it is essential that these materials be in finely divided form in order to achieve the necessary degree of intimate association. In order to achieve the necessary degree of intimate association required to impart the desirable and necessary properties of attrition resistance and the like to the final catalyst product, it has been determined that the additive material should have an average particle size of not over 20 microns, and preferably not over 8 microns. These additives may be obtained commercially, characterized by suitable average particle size. If not, grinding or other suitable means should be employed to insure suitable particle size distribution. Failure to so control particle size results in excessive fines and poor attrition properties. This is attributed to uneven shrinkage on drying, causing particle breakup or fracturing.

The finely divided inorganic additive material is employed in amounts such as to constitute from between 10 and about 90% by weight of the final catalyst, and preferably from between about 40 and 60% by weight thereof, for optimum physical and catalytic properties.

Attrition resistance, as referred to hereinabove and hereinafter, is measured as percent overhead. This value is obtained by placing a known amount of catalyst material of predetermined weight, such as a 50 gram sample, and placing the same in a hollow cylinder. A stream of air is then turned on to an accurately established standard rate of flow of air, as for example, 15 cubic feet per hour as determined by a metering device. Periodically at any desired time, as for example, 10, 20, 45 or more hours, a collection system, usually a flask, is removed and emptied, and the weight of the catalyst reduced to a particle size of 12 microns or less is determined. This weight is then used to calculate percent overhead and such a factor is indicative of the attrition resistance of the catalyst. The lower the percentage of overhead, the higher is the attrition resistance of the catalyst.

It is an essential element of this invention that the finely divided inorganic additive material and the silica gel and alumina gel components be in intimate association, one with the other, for a suitable catalyst product to result. The specific means of obtaining this intimate association will be described in detail hereinafter.

In accordance with the present invention, a finely divided inorganic additive material, such as kaolin, may be added to a water heel, as for example, in a conventional strike tank and a suitable alkali metal silicate solution added thereto. Thereafter, while stirring a suitable acid, as for example, sulfuric acid, hydrochloric acid, or the like may be added to the strike tank mixture in order to precipitate a hydrated silica or silica gel onto and into intimate association with the finely divided dispersed inorganic additive material.

In addition, intimate association between the silica gel and additive may be achieved by the addition of a suitable precipitating agent for an alkali metal silicate and additive material to a water heel, and while maintaining agitation to insure uniform precipitation, adding an alkali metal silicate thereto. Thus, for example, an inorganic additive material such as kaolin may be present in a water heel with a suitable precipitating agent, such as acid or aluminum sulfate and an alkali metal silicate added thereto, whereby the hydrated silica is precipitated onto the inorganic additive material.

Alternatively, a slurry of an alkali metal silicate and a finely divided inorganic additive material may be added to a strike tank, containing a suitable precipitating agent, as for example, an acid, aluminum sulfate, or the like.

Regardless of which of the above general procedures are employed, an intimate association between an inorganic additive material and precipitated hydrated silica results.

It is an essential aspect of this invention in order to achieve the necessary intimate association, however, that the additive material be present and suspended in aqueous medium as in a strike tank at the time of the precipitation of the hydrated silica or silica gel.

The precipitation of the hydrated silica onto the finely divided inorganic additive material may be carried out over a pH range of between 2.5 and 10, and at a temperature of between 20 and 60° C. This is true regardless of the alternative procedures above-described in that whether it is an acid addition to an alkaline medium whereby the pH declines from a high alkaline pH into the precipitation range for the hydrated silica, pH 8 to 9, or whether it is an addition of an alkali metal silicate alone or in combination with an inorganic additive material into an acid medium, in which case the pH rises from a low acid value into the range above-described.

Temperatures, as for example, below 15° C., require excessive time for reaction and result in a low porosity product having poor stability. Higher temperatures, as for example, above 65° C., result in products having low bulk density, poorer attrition properties, and excessively high porosity. Preferably, temperatures between 25 and 40° C. are employed.

Regardless of the order of addition or the method of addition, the ultimate solids content of the initial intimately mixed slurry should be from between 3 and 9% and preferably about 6.5%, it being determined that best control of the final product is achieved by operating in this range.

Of the above-described general procedures, the first is preferred for effectiveness in achieving intimate association and from the aspect of further processing, including washing and filtration to remove impurities such as alkali metals, which function to poison and diminish the activity of the final catalyst material.

Thereafter, the intimately associated silica hydrate and inorganic additive material are filtered, washed and, if need be, reslurried and the process repeated until the product is substantially free of alkali metal salts and other undesirable impurities.

The substantially alkali metal free intimate mixture is thereafter coated with a hydrated alumina or alumina gel. This coating or the precipitation of a hydrated alumina onto the silica additive material mixture may be achieved by employing various procedures. Thus, for example, commercial alum or alumina sulfate may be added to a reslurried silica-additive material mixture and an alkali metal aluminate, such as sodium aluminate, added to the composition to a pH of from between 3.5 and 6, in which pH range the hydrated alumina is precipitated out of solution and onto the intimately associated silica-additive particles.

Alternatively, alum or aluminum sulfate may be added to the silica-additive aqueous slurry and ammonia or other suitable alkali added to adjust the pH to between 3.5 and 6 in which pH range the hydrated alumina is precipitated out and into intimate association with silica-additive substrate.

As a third general procedure employable during the "coating" of the silica-additive material with a hydrated alumina, a suitable acid, as for example, sulfric acid, hydrochloric acid, or the like may be added to an aqueous slurry of the silica-additive material and an alkali metal aluminate, such as sodium aluminate added to the slurry composition to produce a pH of between 3.5 and 6 and to precipitate the hydrated alumina onto the silica gel-additive base material.

The temperature during which the "coating" with a hydrated alumina or alumina gel occurs is preferably between 20 and 60° C. and normally from between 25 and 40° C. and the solids in the final slurry may contain from between 3 and 9% and preferably about 6.5% of solids.

Temperature, solids content, and pH are all important factors in achieving the desired degree of intimate association, whether it be during the precipitation of silica in the presence of the inorganic extender material or in the coating of this intimate mixture with the hydrated alumina.

In addition, whether during the precipitation of the silica onto the finely divided inorganic additive material or during the "coating" step, it is essential that the slurries be continuously agitated, mixed or stirred so as to provide uniform coating and uniform particle size.

After the intimately associated silica and inorganic additive material have been coated with the hydrated alumina, the resulting slurry is filtered, then washed and the process repeated if necessary and then dried. Washing the slurry may be effected, as for example, on a conventional rotary Oliver type of filter, and washing the residue is necessary to remove undesirable sulfate and other impurities. The extent of washing required may be determined and is well within the purview of those skilled in the art. Thereafter, the washed alumina gel coated silica gel-additive composition is spray dried to form the microspheroidal catalyst particles of this invention. As an alternative, frequently it is desirable to spray dry the alumina gel coated silica-gel-additive composition prior to washing, in that less water is normally required to remove substantially the same amount of impurities, as for example, sulfate ions present.

Spray drying in accordance with the present invention is accomplished by spraying the composition through a nozzle or off a spray wheel into contact with hot gases. Such drying may be accomplished by any suitable spray drier. One that has been employed with success is described in U.S. Patent No. 2,644,516, dated July 7, 1953. Although gas inlet temperatures of up to 1300° F. may be employed, the temperatures of the drying gas entering the spray drying chamber is preferably controlled within the range of about 400 and 1000° F., so that the silica-alumina hydrogel in intimate association with the additive material will be converted into set, partially dehydrated microspheroidal gel particles. Spray drying usually results in a moisture content of from between 7 and 15% of the spray dried product.

One of the special features of the present invention resides in the fact that the gel-additive composition of this invention may be fed to a spray drier with solids content of from between 9.5 and 12% while conventional catalyst compositions, that is, conventional silica-alumina gel cracking catalyst compositions, are normally fed at an optimum solids content of about 8%. While a special aspect of this invention, it is a highly desirable and important one, in that it permits more efficient use of spray drying apparatus, in that greater "through-put" in a given time period may be obtained.

As has been noted, it is essential to the obtaining of a microspheroidal catalyst of this invention, in which the additive, silica and alumina are in intimate association, that the additive material be present in aqueous media when the silica gel is precipitated. In this connection, if alternative procedures are employed, the intimate association will not be achieved, and in addition, the physical condition of these mixtures and the nature of their association is such that filtration losses encountered during alkali metal or sulfate ion removal at various stages in the processes would be prohibitive, so that the resulting process would not be commercially adaptable. Thus, for example, if a hydrated silica and alumina composition were simply mixed, with an inactive additive material as for example silica, which had been added to a washed silica hydrogel precipitated by the addition of hydrochloric acid to a sodium silicate solution, the losses encountered during filtration would be excessive and prohibitive on commercial filtering apparatus.

The catalyst of this invention is employed as other commercial silica-alumina cracking catalysts in fluid bed conversion processes in which a high boiling petroleum hydrocarbon is catalytically cracked to produce high octane gasoline in its presence. In such a process, as is well known to those skilled in the art, the catalyst particles are in a state of suspension in a vaporous stream of hydrocarbon and the cracking is effected or carried out in temperatures in the range of between 700 and 1100° F. and preferably between 900 and 1000° F.

In order that the present invention may be more fully understood, the following examples are given primarily by way of illustration. No specific details or enumerations described therein should be construed as critical limitations in the specification, except as they appear in the appended claims. All parts and percentages are by weight unless otherwise specifically designated.

EXAMPLE 1

An aqueous dispersion of finely divided paper maker's kaolin, characterized by an average particle size of .77 micron, was added to a strike tank. The amount of kaolin added was theoretically an amount sufficient to provide 50% kaolin in the final catalyst product. Thereafter, an aqueous sodium silicate solution was added to the kaolin-water suspension in an amount sufficient to provide a solids content of 6.5%, based on the total content. This dispersion was agitated carefully and completely to insure uniform mixing and thereafter sulfuric acid was added to the strike tank to a pH of 9.5. Continuous agitation was employed to insure uniformity of the mixture. Thereafter, additional sulfuric acid was added to a pH of 3. Mild agitation was continued in order to insure completeness and uniformity of the coating.

Thereafter, an alum solution containing 8% $Al_2O_3$ was added to the intimately associated kaolin-silica hydrate or silica gel composition and a sodium aluminate solution added thereto to adjust the pH to 4.7. The addition of the sodium aluminate was carried out with continuous agitation in order to insure uniform precipitation of hydrated alumina or alumina gel onto and into intimate association with the kaolin-silica gel component. Alum and sodium aluminate were employed in an amount sufficient to provide a total solids content of 6.5%.

Thereafter, the silica gel-alumina gel coated finely divided kaolin was filtered and washed until substantially free of sodium and sulfate ions and thereafter fed to the spray drier at a solids content of about 10%. The spray drier was employed using inlet temperatures of 750° F. and the resulting product contained 86% of solids and was in the form of microspheroidal particles.

On an ignition solids basis (solid at 1000° C.), the catalyst contained 41% kaolin. The catalyst exclusive of kaolin contained 75% silica and 25% of alumina.

EXAMPLE 2

A procedure similar to that employed in Example 1 was employed, with the exception that instead of finely divided paper maker's kaolin, a finely divided silica flour characterized by a particle size of 95% minus 200 mesh was employed.

The final product, an intimately associated silica flour-silica-alumina microspheroidal catalyst contained 50% of silica flour. The catalyst exclusive of silica flour contained 87.5% of silica and 12.5% of alumina.

EXAMPLE 3

Kaolin in an amount sufficient to provide 45% by weight of kaolin in the final catalyst product, was added to a high alumina silica-alumina hydrogel and mixed thoroughly. The high alumina silica alumina hydrogel, before modification with the kaolin, contained 75% silica and 25% alumina on an ignited basis.

The combination of the kaolin and silica-alumina hydrogel was mixed thoroughly and thereafter homogenized to 55% minus 325 mesh as a means of achieving intimate association between the additive and silica alumina hydrogel.

EXAMPLE 4

Two and one-half pounds of untreated Georgia kaolin clay was added with good agitation to a sulfuric acid solution containing one pound 95% $H_2SO_4$ and 2.9 pounds of water. A sodium silicate solution (containing 5.3 pounds sodium silicate, 28.5% $SiO_2$, 8.9% $Na_2O$) and 24 pounds of water was slowly added to the acid with good agitation at 50° C. until a pH of 5 was reached. An alum solution containing 3.8 pounds of water and 2.9 pounds of alum (17.3% $Al_2O_3$) was then added to the gel slurry. The coating step was completed by addition of 14% ammonia solution with good agitation to pH=5.0. The resultant silica-alumina-kaolin slurry was repeatedly filtered and washed to reduce $Na_2O$ and sulfate content to low level before spray drying.

The final catalyst product contained 56% by weight of kaolin. The catalyst exclusive of kaolin contained 75% silica and 25% by weight of alumina.

EXAMPLE 5

A sodium silicate solution containing 5.3 pounds of sodium silicate (28.5% $SiO_2$, 8.9% $Na_2O$) and 24 pounds of water was blended with 2 pounds of acid washed kaolin (99% —325 mesh) with good agitation. Sulfuric acid solution (25% $H_2SO_4$) was slowly added to the silicate-kaolin slurry at 50° C. with good agitation to pH=5.0. After 15 minutes an alum solution containing 3.8 pounds of water and 2.4 pounds of alum (17.3% $Al_2O_3$) was added to the gel slurry. The coating step was completed by addition of ammonia to pH=5.0. The resultant silica-alumina-kaolin slurry containing soluble salts was spray dried. After spray drying, the soluble salts were removed by repeated filtration and washing before finally drying at 200° C.

The final catalyst product contained 50% by weight of kaolin. The catalyst exclusive of kaolin contained 75% of silica and 25% by weight of alumina.

EXAMPLE 6

219 pounds of sodium silicate were added to 2100 pounds of water containing 125 pounds of kaolin in a turbine agitated tank. To the above mixture about 124 pounds of 25% acid was added to pH 8.5 and held at this pH for 15 minutes. Gelation of silica occurred within this 15 minutes hold period. The slurry contained about 5 gel solids.

187 pounds of 7.5% aluminum sulfate diluted with 150 pounds of water was added to the above formed hydrogel. The resulting pH was 3.1. 24.5 pounds of 29% sodium aluminate solution containing about 20% excess caustic was added to the resulting pH of 4.0. Additional caustic was used to adjust the pH to 4.5 prior to filtering and washing.

The coated slurry was then washed free of sodium and sulfate ions and spray dried. The catalyst contained 70% by weight of kaolin. The catalyst exclusive of kaolin contained 25% of alumina and 75% of silica, by weight.

The resulting microspheroidal catalyst was characterized by acceptable attrition, activity and stability.

Test results on catalysts prepared in Examples 1–5 above are recorded in Table I hereinbelow, as are the results of these catalysts in comparison with a commercial high alumina silica-alumina fluid catalyst, catalyst A, and a natural fluid clay catalyst prepared from Halloysite, designated catalyst B.

Table I

| Sample design | Additive | | | Hydrogel particle size to drier, weight percent | | Structure | | | Particle size, weight percent by MM sieve | | Overhead, weight percent | | | Catalyst properties | | |
|---|---|---|---|---|---|---|---|---|---|---|---|---|---|---|---|---|
| | Nature | Amount, weight percent | Added to | —90u | —44u | SA m.²/g. | PV cc./g. | ABD g./cc. | —90u | —20u | 5 hr. | 20 hr. | 45 hr. | A | AGC test | |
| | | | | | | | | | | | | | | | G | C |
| Example 3 | Kaolin | 45 | Gel | 68 | 55 | 318 | .65 | .39 | 87 | 8 | 27 | 48 | 64 | 63 | 1.3 | 1.6 |
| Example 3 (S) | do | 45 | do | | | | | .44 | | | | | | 23 | 1.2 | 1.3 |
| Example 1 | do | 41 | Silicate | 70 | 59 | 346 | .57 | .48 | 94 | 5 | 9 | 14 | 18 | 79 | 1.2 | 1.5 |
| Example 1 (S) | do | 41 | do | | | 109 | | .56 | | | | | | 20 | 1.1 | 1.3 |
| Example 2 | $SiO_2$ flour | 50 | do | 60 | 54 | 328 | .52 | .41 | 93 | 7 | 12 | 17 | 22 | 66 | 1.4 | 2.0 |
| Example 2 (S) | do | 50 | do | | | 106 | | .55 | | | | | | 19 | 1.2 | 1.4 |
| Example 4 | Kaolin | 56 | Acid | 70 | 30 | 310 | .35 | .65 | 90 | 3 | 3 | 10 | 12 | 60 | 1.3 | 1.6 |
| Example 5 | do | 50 | Silicate | 65 | 45 | 250 | .35 | .65 | 88 | 4 | 4 | 11 | 13 | 58 | 1.2 | 1.5 |
| Catalyst A | None | 0 | | | | 519 | .91 | .37 | 87 | 4 | 8 | 11 | 16 | 120 | 1.2 | 1.4 |
| Catalyst A (S) | do | 0 | | | | | | .47 | | | | | | 32 | 1.2 | 1.4 |
| Catalyst B | | | | | | 184 | .40 | .63 | 95 | 0 | 7 | 20 | 33 | 28 | 1.6 | 3.2 |
| Catalyst B (S) | | | | | | 81 | | .68 | | | | | | 16 | 1.3 | 1.8 |

F=fresh calcine at one hour at 1,100° F.
S=steamed 17 hours at 750° C. at atmospheric pressure. Accelerated test determines stability. Data recorded under "S" measured after one hour in a cracking unit according to the "American Cyanamid's Manual of Test Methods for Synthetic Fluid Cracking Catalysts" 1957.

NOTE.—Catalyst A=a 25% alumina silica-alumina fluid cracking catalyst. Catalyst B=a commercially available natural fluid catalyst.

Table I hereinabove clearly demonstrates that lower losses due to attrition are achieved by employing the method of this invention as in accordance with Examples 1, 2, 4 and 5, rather than mixing with a hydrogel of particle size given in Example 3.

In accordance with the present invention, the surface area of the catalyst product is believed to be about linear with respect to the additive content, while the pore volume of catalyst containing additive is higher than should be predicted on an average basis. Average pore diameter is greater for catalysts as prepared in Example 1 than that of a commercial 25% alumina catalyst, as determined by the formula:

$$PD \text{ (pore diameter)} = 4[V \text{ (pore volume)}/S \text{ (surface area)}] \times 10^4$$

One of the principal advantages of the present invention resides in the fact that a catalyst characterized by good activity, attrition resistance, surface area and the like may be achieved, which is fully competitive with commercial fluid and commercial synthetic fluid catalysts currently employed in the petroleum industry, insofar as yields of gasoline components are concerned, and comparisons illustrating this feature are shown in Table II hereinbelow.

Table II
RELATIVE YIELD VALUES

| Component | Example 3 | | Example 1 | | Example 2 | | Catalyst B [1] | |
|---|---|---|---|---|---|---|---|---|
| | F | S | F | S | F | S | F | S |
| C5–400° F | 1.0 | | .95 | 1.1 | 0.9 | 1.0 | 1.0 | 1.1 |
| n-Butane | 1.0 | | 1.3 | 1.0 | 1.4 | 1.0 | 1.0 | 1.0 |
| i-Butane | 1.0 | | 0.9 | 0.7 | 1.0 | 0.8 | 0.6 | 0.5 |
| Butenes | 1.1 | | 1.0 | 1.0 | 1.1 | 1.1 | 0.9 | 0.8 |
| Propane | 0.6 | | 0.9 | 0.6 | 0.9 | 0.9 | 0.5 | 0.5 |
| Propenes | 1.1 | | 1.20 | 0.8 | 1.0 | 0.9 | 0.9 | 0.9 |
| C₂ and lighter | 0.9 | | 0.8 | 0.9 | 1.0 | 0.8 | 1.1 | 1.0 |
| Carbon | 1.6 | | 1.4 | 1.3 | 1.9 | 1.5 | 2.3 | 2.0 |

[1] =½ hour process period. Other data 1 hour process period.

These results in Table II indicate that the kaolin modified high alumina catalyst of this invention is substantially equivalent to commercially available high alumina silica catalyst with the following exceptions. The catalyst of this invention may produce slightly higher normal butane and coke, while giving less propane production and lower light gas production. It has been found that gasoline yield increases and isobutane may decrease on steaming.

The comparison with the natural clay catalyst designated as catalyst B in Table II indicates that the catalyst of this invention results in higher normal and isobutane production and lower light gas and lower carbon production than such natural commercial fluid catalysts. Further, it has been determined that the gasoline component obtained by use of the catalyst of this invention has an octane advantage over natural commercial Halloysite catalysts.

EXAMPLE 7

1650 parts of finely divided untreated kaoline clay was slurried to form a 10.9% solids clay slurry and 1540 parts of sodium silicate was added thereto. This composition was mixed and silica hydrogel precipitated by the addition of sulfuric acid thereto, to a pH of 8.1. Addition time for the acid was about 13 minutes, and thereafter the gel aged for an additional 7 minutes at a temperature of 1140° F.

To the aged gel-kaolin mixture 1470 parts of alum (commercial aluminum sulfate) is added to produce a pH of 2.7. A 14% ammonia solution to precipitate 110 parts of alumina onto the gel-kaolin mixture is then added. After "coating" or precipitation of alumina, the composition had a solids content of 13.3% and a pH of 5.

The composition was then washed, filtered and washed until the sodium oxide, sulfate and iron content were of acceptable level in the final catalyst. The so resulting material was spray dried to produce a final catalyst product containing 75% by weight of kaolin. The catalyst exclusive of kaolin was 25% by weight of silica-alumina, containing 25% alumina and the balance silica.

EXAMPLE 8

860 parts of finely divided untreated kaolin clay was slurried to form a 10% solids clay slurry and 400 parts of sodium silicate was added thereto. This composition was mixed and silica hydrogel precipitated by the addition of sulfuric acid thereto to a pH of 7.2. The acid addition required 7 minutes and thereafter the gel-kaolin composition was aged for 10 minutes. The temperature during aging was 130° F.

260 parts of an alum (commercial aluminum sulfate) in solution was added to the gel-kaolin composition and the pH of the composition thereafter was 2.5. This addition resulted in the precipitation onto the gel-kaolin composition of alumina. 70 parts of sodium aluminate was then added and additional alumina was precipitated therefrom. When "coating" or the precipitation of alumina was complete, the composition had a solids content of 10.8 and a pH of 4.4. The composition was filtered, washed and filtered until an acceptable sodium oxide, sulfate and iron level obtained and then spray dried. The final catalyst contained 85% by weight of kaolin and 15% by weight of synthetic silica-alumina, containing about 25% by weight of alumina and 75% by weight of silica.

The catalyst prepared in Examples 7 and 8 were evaluated for their physical properties and characteristics as well as their activity, gas and coke fractions. These values are reported in Table III below.

Table III

|  | Catalyst 7 | Catalyst 8 |
|---|---|---|
| Pore volume | 0.45 | 0.45 |
| Surface area | 161 | 76 |
| ABD | 0.54 | 0.57 |
| Attrition (1 hour) | 11 | 16 |

|  | Fresh | Steamed at 750° C | Fresh | Steamed at 750° C |
|---|---|---|---|---|
| Activity | 30 | 11 | 17 | 7 |
| Gas | 1.6 | 1.3 | 1.5 | 0.8 |
| Coke | 2.6 | 1.5 | 2.2 | 1.85 |

| Particle size, percent: | | |
|---|---|---|
| 100 mesh | 98 | 98 |
| 200 mesh | 62 | 61 |
| 325 mesh | 26 | 26 |
| 40 u | 20 | 21 |
| 20 u | 5 | 4 |

Table III illustrates that even at these high concentrations of additive, namely 75 and 85%, based on the total weight of the final catalyst, the catalyst is acceptable for many purposes, may be prepared in accordance with the process of this invention.

As an alternative to the present process, it may be proposed to either modify low alumina silica alumina, as for example, the type containing about 13% alumina, or to simply employ such catalysts in lieu of the modified catalyst in this invention. With respect to the first procedure, it will be apparent that such modification of a low alumina catalyst to any significant degree would result in a relatively low activity for such a catalyst, in that the amount of alumina and thus the active catalytic sites contained therein may be readily reduced beyond an acceptable limit. Further, a particular and important advantage of this invention would be lost. This advantage is that by the present process a modification of a high alumina silica alumina fluid cracking catalyst material is possible whereby a final catalyst product having an acceptably high number of catalytically active sites is readily and inexpensively produced.

As has been pointed out, the catalyst of this invention is less costly to manufacture than comparative low alumina silica alumina catalysts for numerous apparent reasons. Thus, it should be noted that in the preparation of the high alumina silica-alumina hydrogel, it is not necessary to filter and wash the hydrogel components as thoroughly to achieve a given alkali metal and sulfate ion content based on the finished catalyst product.

While the present invention has been described primarily in conjunction with silica-alumina catalysts of the high alumina type, that which contain 25% of alumina, it should be noted that small amounts of other catalytically active materials, as for example, titania, magnesia, and the like, may be present in the catalyst composition of this invention for a particular application and use.

We claim:

1. A process for preparing a microspheroidal silica-alumina fluid cracking catalyst, which comprises intimately associating by precipitating in an aqueous medium a hydrated silica in the presence of a finely divided inorganic silicious additive material, precipitating a hydrated alumina onto said intimately assocated mixture, and spray-drying the resulting product, said catalyst exclusive of the additive material being characterized by a silica content of between 65 and 95% and an alumina content of between about 5 and 35% by weight, said additive material being employed in an amount of from between 10 and about 90%, based on the weight of the catalyst.

2. A process according to claim 1 in which an alkali metal silicate is added to a slurry of finely divided inorganic silicious additive material containing a precipitating agent for the alkali metal silicate.

3. A process according to claim 1 in which the hydrated silica is precipitated onto the finely divided inorganic silicious additive material by the addition of a slurry of an alkali metal silicate and a finely divided inorganic silicious additive material to a precipitating agent selected from the group consisting of an acid and aluminum sulfate.

4. A process according to claim 1 in which hydrated alumina is precipitated onto the intimate mixture of hydrated silica and finely divided inorganic silicious additive material by precipitating hydrated alumina from an alum solution with an alkali metal aluminate at a pH of between 3.5 and 6.

5. A process according to claim 1 in which the hydrated alumina is precipitated onto the intimately associated silica and a finely divided inorganic silicious additive material by the addition of alum followed by the addition of ammonia at a pH of between 3.5 and 6.

6. A process according to claim 1 which comprises washing said intimate mixture of finely divided inorganic silicious additive material, hydrated silica and hydrated alumina to free said gelled product from alkaline earth metals and other impurities and thereafter spray drying the resulting product.

7. A process according to claim 1 in which the intimately associated gel product is first spray dried and then washed.

8. A process according to claim 1 in which the catalyst, exclusive of the additive material is characterized by a silica content of between 70 and 80%, an alumina content of between 30 and 20% by weight and said additive material is employed in an amount of from between 40 and 60%, based on the weight of the catalyst.

9. A process according to claim 1 in which the additive material is selected from the group consisting of kaolin and materials derived therefrom.

10. A process according to claim 1 in which a hydrated alumina is precipitated onto said intimately associated mixture by the addition of an aluminum sulfate solution to an intimately associated additive-silica gel mixture having a pH above about 8.5 and precipitating alumina onto said mixture by the addition of an alkali metal aluminate thereto.

11. A process according to claim 2 in which the precipitating agent for the alkali metal silicate is selected from the group consisting of acid and aluminum sulfate.

12. A process according to claim 8 in which the additive material is selected from the group consisting of kaolin and materials derived therefrom.

13. A process according to claim 8 in which the additive material is silica flour.

14. A process for preparing a micropheroidal silica-alumina fluid cracking catalyst, which comprises intimately associating by precipitating in an aqueous medium a hydrated silica in the presence of a finely divided inorganic silicious additive material by the addition of acid to an alkali metal silicate solution, precipitating a hydrated alumina onto said intimately associated mixture and spray drying the resulting product, said catalyst exclusive of the additive material being characterized by a silica content of between 65 and 95% and an alumina content of between about 5 and 35% by weight, said additive material being employed in an amount of from between 10 and about 90% based on the weight of the catalyst.

15. A process according to claim 14 in which the silica is precipitated onto the inorganic silicious inorganic additive material at a pH of from between 2.5 and 10 at a temperature of between 20 and 60° C. and at a total solids content of the aqueous medium of from between 3 and 9%.

16. A process according to claim 15 in which the additive material is selected from the group consisting of kaolin and materials derived therefrom.

References Cited in the file of this patent
UNITED STATES PATENTS

| | | |
|---|---|---|
| 2,487,065 | Milliken | Nov. 8, 1949 |
| 2,631,983 | Milliken | Mar. 17, 1953 |
| 2,669,547 | Shabaker | Feb. 16, 1954 |